United States Patent [19]

Kawasawa et al.

[11] Patent Number: 4,583,961
[45] Date of Patent: Apr. 22, 1986

[54] BELT TENSIONER

[75] Inventors: Toshio Kawasawa, Aichi; Katsujiro Sato, Toyota; Akiyoshi Sugiura, Okazaki, all of Japan

[73] Assignee: Toyota Jidosha Kabushiki Kaisha, Aichi, Japan

[21] Appl. No.: 620,823

[22] Filed: Jun. 15, 1984

[30] Foreign Application Priority Data

Jun. 23, 1983 [JP] Japan .............................. 58-97261[U]

[51] Int. Cl.$^4$ .............................................. F16H 7/14
[52] U.S. Cl. .................... 474/113; 474/114; 474/133
[58] Field of Search ................ 474/113, 114, 115, 133

[56] References Cited

U.S. PATENT DOCUMENTS 3,922,927 12/1975 Shiki et al. ..................... 474/113
4,512,752 4/1985 Brenneman .................. 474/133 X

OTHER PUBLICATIONS

Japanese Laying-Open Utility Model Publication Sho 55-86144.

Primary Examiner—James A. Leppink
Assistant Examiner—Frank McKenzie
Attorney, Agent, or Firm—Parkhurst & Oliff

[57] ABSTRACT

A belt tensioner for use of a V-belt which is spanned between a driving member and a driven member. The belt tensioner has an adjust bolt to be rotated by a worker, a bracket which slidably supports a slider secured to the driven member. The adjust bolt comprises a head portion, a first shaft portion which has a threaded relation with a hole within the bracket, and a second shaft portion which has a thread relation with the slider. Further, a spring is provided between the head portion of the adjust bolt and the bracket to bias the adjust bolt in such a direction as the head portion of the adjust bolt is separate away from the bracket, thereby obtaining an optimum belt tension force.

7 Claims, 15 Drawing Figures

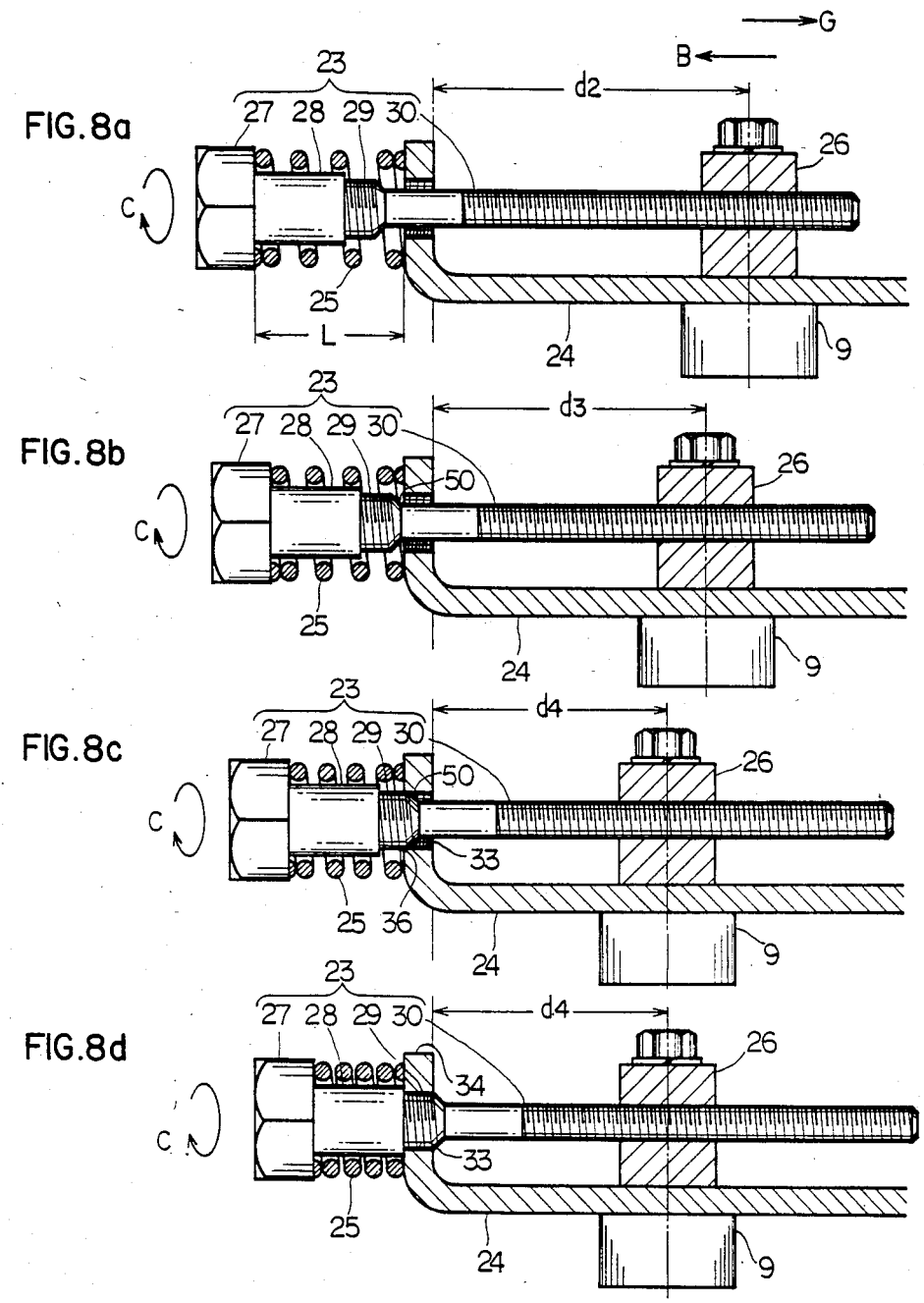

BELT TENSIONER

BACKGROUND OF THE INVENTION

The present invention relates to a belt tensioner for use of a V-belt which is spanned between a crank pulley of an internal combustion engine and an alternator, and more particularly to a belt tensioner which can obtain an optimum tension force applied on a V-belt.

As shown in FIG. 1, an internal combustion engine 3 generally has a crank pulley 21, an alternator 1, and a V-belt 2 spanned between the crank pulley 21 and the alternator 1. The rotation of the crank pulley 21 is transmitted through the V-belt 2 to the alternator 1. If the tension force applied onto the V-belt 2 is greater than an adequate value, this impairs the endurance of bearings employed for the alternator 1. Conversely, if the tension force applied onto the V-belt 2 is less than the adequate value, this causes a slippage of the V-belt 2 and further a decrease in an amount of an electric power generated by the alternator 1. In general, a tension force applied onto the V-belt 2 is adjusted by such a procedure as the alternator 1 is rotated around a bolt 13 mounted on the internal combustion engine 3. A worker sets an optimum tension force while the worker measures the amount of a tension force applied on the V-belt 2. However, it is difficult to easily set an optimum belt tension force. To ease the adjustment operation of a belt tension force, there is proposed a belt tensioner 5 as shown in FIG. 2. (This belt tensioner 5 is disclosed in the Japanese Laying-open Utility Model Publication Sho 55-86144.)

According to the belt tensioner 5 shown in FIG. 2, an optimum belt tension force is obtained by the way such that a bolt 6 only is rotated. The tension force adjustment is made as following procedure. Firstly, a worker loosens the bolt 13 which fixes an alternator 1 to a flange portion 46 of an internal combustion engine 3. Nextly, the worker loosens a nut (not shown in drawings) which fixes the alternator 1 to a bracket 12 in association with a bolt 4. Further, the worker rotates the bolt 6. FIG. 3 illustrates an enlarged cross-sectional view taken along the line III—III in FIG. 2. As shown in FIG. 3, an adjust bolt 8 has a thread engagement with a head portion of a bolt 4 which fixes an arm 9 of the alternator 1 to the belt tensioner 5. When the bolt 6 rotates in the direction D shown in FIG. 3, the adjust bolt 8 rotates with the bolt 6. This rotation moves the arm 9 of the alternator 1 in the direction B shown in FIG. 3. As a result, the alternator 1 rotates around the bolt 13 in the clockwise direction A shown in FIG. 2. Hence, according to the rotation of the alternator 1, the tension force of the V-belt 2 increases. According to the increase in the tension force applied on the V-belt 2, there is generated a force for pulling the adjust bolt 8 in the direction G shown in FIG. 3. When the adjust bolt 8 is pulled in the direction G shown in FIG. 3 against the biasing force of the spring 11 by the stroke greater than the distance corresponding to the height H of a pawl 7, a head portion 10 of the adjust bolt 8 is disengaged from the pawl 7. In this condition, even if the bolt 6 rotates, the rotation of the bolt 6 is not transmitted to the adjust bolt 8. Hence, the V-belt 2 cannot be applied with more tension force. In this circumstances, the force of the spring 11 becomes equal to the tension force of the V-belt 2. In this belt tensioner 5, the spring constant of the spring 11 is designed to have such a value as the tension force applied on the V-belt 2 becomes the appropriate value when the force of the spring 11 becomes equal to the tension force of the V-belt 2. Thus, when the bolt 6 rotates idle, the worker stops the rotation of the bolt 6. The worker fastens the nut (not shown in drawings) which has a thread relation with the bolt 4 and fastens the bolt 13 shown in FIG. 2, thereby fixing the mounted position of the alternator 1. Thus, the tension force of the V-belt 2 is adjusted. The belt tensioner 5 has a simple structure and can easily set the tension force of the V-belt 2 to the optimum value. However, this belt tensioner 5 is not preferable from the stand point that the belt tensioner 5 has the following disadvantages. According to the belt tensioner 5, it performs such an operation as the pawl 7 disengages from the head portion 10 of the adjust bolt 8. Immediately before the pawl 7 disengages from the head portion 10 of the adjust bolt 8, the pawl 7 is engaged with only a small portion of the head portion 10. When the pawl 7 disengages from the head portion 10 of the adjust bolt 8, the pawl 7 strikes against the head portion 10 of the adjust bolt 8 and the edge portions of the pawl 7 and the head portion 10 wear down. While a vehicle is employed, the belt tensioner 5 is repeatedly adjusted by such a way as the pawl 7 is disengaged from the head portion 10 of the adjust bolt 8. Hence, the edge portions of the pawl 7 and the head portion 10 further wear down. This causes the earlier disengagement between the pawl 7 and the head portion 10 of the adjust bolt 8, than the initially set timing. In other words, the more the belt tensioner 5 is adjusted, the weaker the tension force of the V-belt 2 is adjusted.

SUMMARY OF THE INVENTION

The present invention was made in view of the foregoing background and to overcome the foregoing drawbacks. It is accordingly an object of this invention to provide a belt tensioner which can constantly obtain an optimum tension force even how many times the belt tensioner is adjusted.

To attain the above objects, a belt tensioner according to the present invention, adjusts a belt tension force of a belt for transmitting a torque of a driving member which is mounted on a main body to a driven member which is rotatably mounted on the main body. The belt tensioner has an adjust means, a bracket secured to the main body, and a slider secured onto the driven member at one end thereof. The adjusting means includes a head portion, a first shaft portion which has a thread relationship with a hole provided in the bracket, and a second shaft portion which slidably supports the slider. The adjust means is constantly biased by the biasing means which is provided between the head portion and the bracket. When the adjust means rotates to obtain an optimum belt tension force, the slider approaches to the first shaft portion according to the rotation of the adjust means. Further, the adjust means rotates, thereby reaching to the condition that the first shaft portion fits into the hole within the bracket. Finally, when the head portion becomes in the contact relation with the bracket, the optimum belt tension force is obtained.

BRIEF DESCRIPTION OF THE DRAWINGS

The above objects, features and advantages of the present invention will become more apparent from the following description of the preferred embodiments taken in conjunction with the accompanying drawings, wherein:

FIG. 8 is a view which illustrates the operated conditions of the belt tensioner according to an embodiment of the present invention;

DETAILED DESCRIPTION OF THE PREFERRED EMBODIMENTS

The present invention is described in detail with reference to the accompanying drawings which illustrate different embodiments of the present invention.

Figure 1:
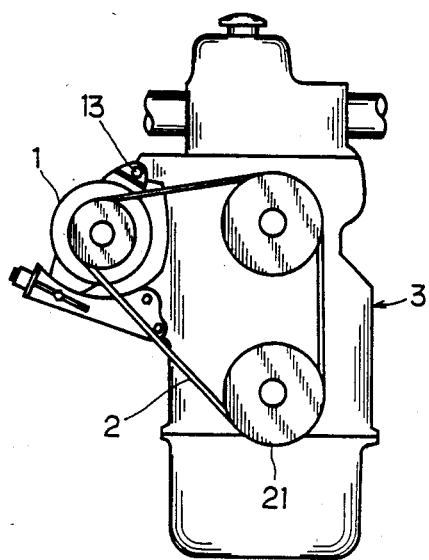
FIG. 1 is a front view of an internal combustion engine for use of a vehicle, in which a belt tensioner is employed.
Figure 2:
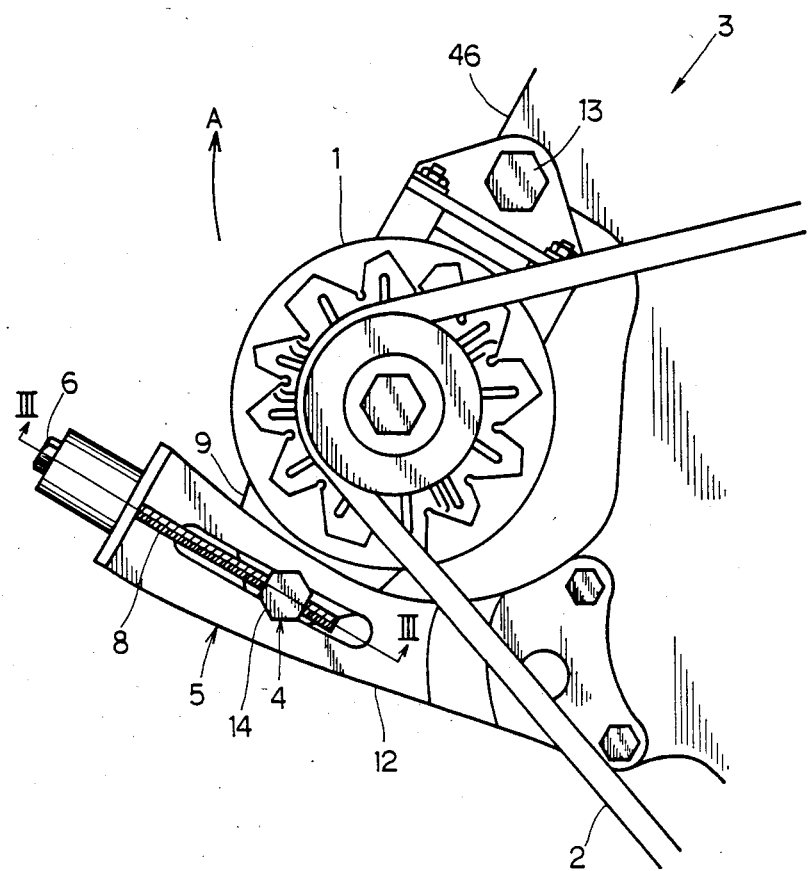
FIG. 2 is an enlarged front view of a belt tensioner according to a prior art.
Figure 3:
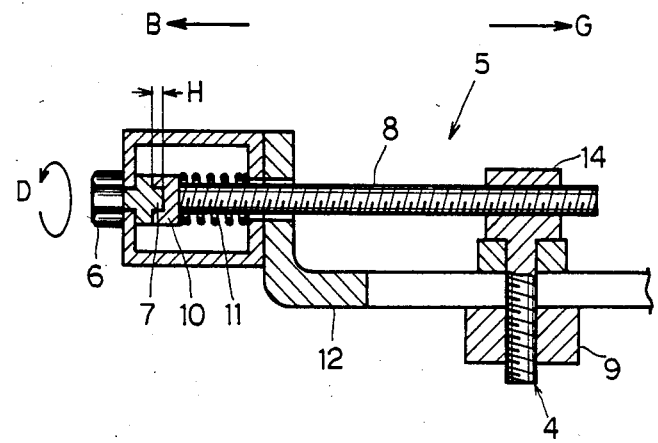
FIG. 3 is an enlarged cross-sectional view taken along the line III—III in FIG. 2.
Figure 4:
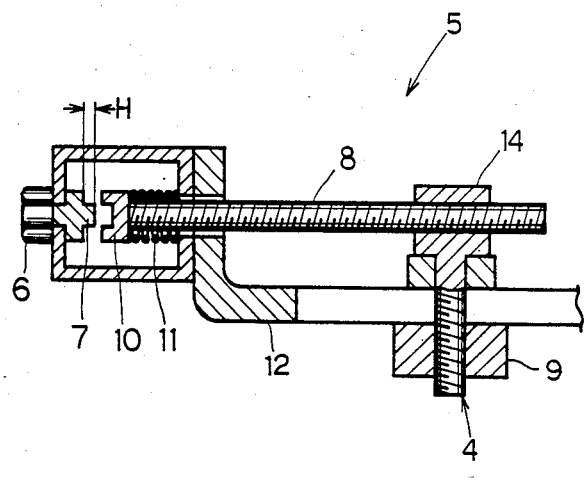
FIG. 4 is a view of a belt tensioner according to a prior art, which illustrates its disengaged condition.
Figure 5:
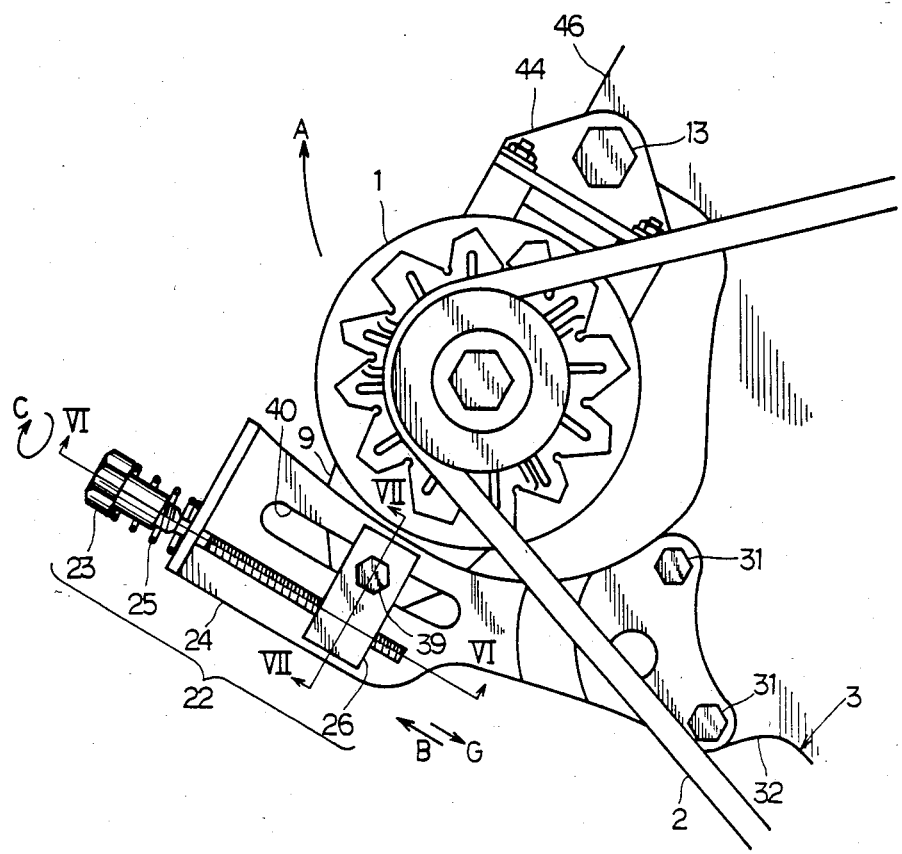
FIG. 5 is an enlarged front view of a belt tensioner according to an embodiment of the present invention.

FIG. 5 illustrates an enlarged front view of a belt tensioner according to an embodiment of the present invention. The numeral 1 designates an alternator. The numeral 2 designates a V-belt which transmits a rotation force of a crank pulley 21 (shown in FIG. 1) of an internal combustion engine 3 to the alternator 1. The numeral 22 designates a belt tensioner according to the present embodiment. The alternator 1 includes a first arm 9 and a second arm 44. The alternator 1 is fixed through a bolt 13 provided on the second arm 44 to a first flange portion 46 of the internal combustion engine 3. The tension force of the V-belt 2 is adjusted by such a way as the alternator 1 is rotated by the belt tensioner 22 around the bolt 13.

Figure 6:
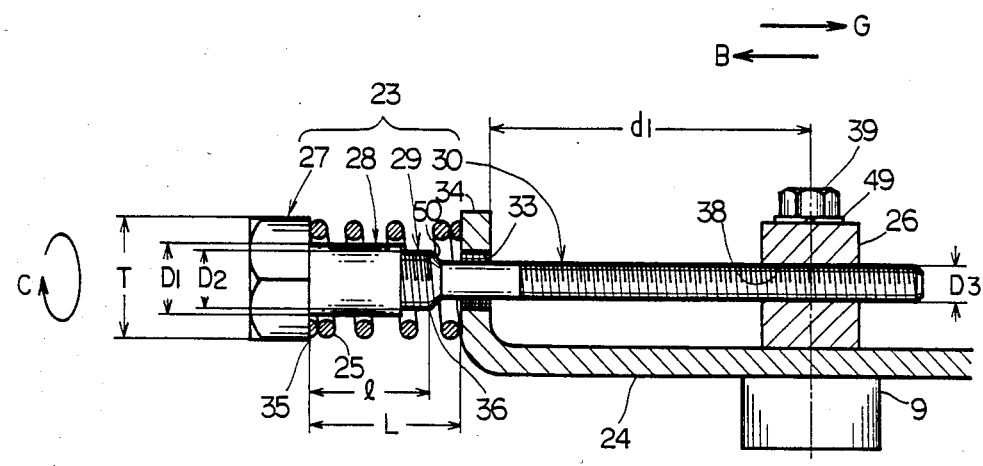
FIG. 6 is an enlarged cross-sectional view taken along the line VI—VI in FIG. 5.

The belt tensioner 22 comprises an adjust bolt 23, a bracket 24, a compression coil spring 25, and a slider 26. FIG. 6 illustrates an enlarged cross-sectional view taken along the line VI—VI in FIG. 5. As shown in FIG. 6, the adjust bolt 23 comprises a head portion 27 on which a tool is fitted in order to rotate the adjust bolt 23, a neck portion 28, a first shaft portion 29, and a second shaft portion 30. The diameter $D_1$ of the neck portion 28 is designed to be less than the radial outer size T of the head portion 27. The diameter $D_2$ of the first shaft portion 29 is designed to be less than the diameter $D_1$ of the neck portion 28. Further, the diameter $D_3$ of the second shaft portion 30 is designed to be less than the diameter $D_2$ of the first shaft portion 29. The same external thread as to its direction and pitch size are provided on the first shaft portion 29 and the second shaft portion 30. The first shaft portion 29 is connected through an inclined shaft portion 50 with the second shaft portion 30.

As shown in FIG. 5, the bracket 24 is fixed by a pair of bolts 31 to a second flange portion 32 of the internal combustion engine 3. The bracket 24 has a long aperture 40 therein. This long aperture 40 extends on a circular arc whose center is at the bolt 13. As shown in FIG. 6, the bracket 24 has a L-shaped end in which a hole 33 is provided. The longitudinal axis of the hole 33 is provided on a plane which is parallel to a plane including the V-belt 2. Further, the direction of the longitudinal axis 33 of the hole 33 is almost same as the direction designated by the reference A shown in FIG. 5 in which the V-belt 2 is applied with a tension force upon the movement of the alternator 1. As shown in FIG. 6, the hole 33 is provided with an internal thread which engages with the external thread provided on the first shaft portion 29 of the adjust bolt 23. The adjust bolt 23 extends into the hole 33. The compression coil spring 23 is provided between the head portion 27 of the adjust bolt 23 and an end portion 34 of the bracket 24. FIG. 6 illustrates such a condition as the compression coil spring 25 is not applied with any external force and the compression coil spring 25 contacts on the head portion 27 and further the compression coil spring 25 contacts on the end portion 34 of the bracket 24. The natural length L of the compression coil spring 25 is designed to be greater than the distance l defined between an end 35 of the head portion 27 and an end 36 of the first shaft portion 29, as shown in FIG. 6.

A slider 26 includes a hole 38, on which there is provided with such an internal thread as this internal thread engages with the external thread of the second shaft portion 30 of the adjust bolt 23. The second shaft portion 30 of the adjust bolt 23 engages with the internal thread of the hole 38.

Figure 7:
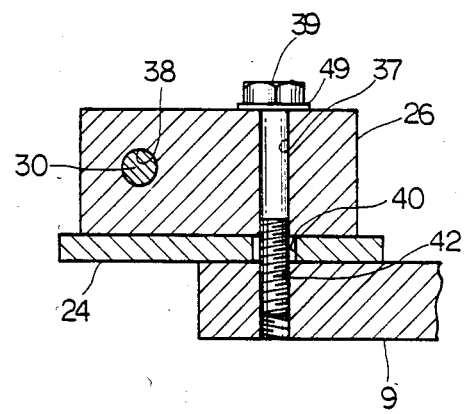
FIG. 7 is an enlarged cross-sectional view taken along the line VII—VII in FIG. 5.

FIG. 7 illustrates an enlarged cross-sectional view taken along the line VII—VII in FIG. 5. As shown in FIG. 7, the slider 26 has a hole 37 through which a bolt 39 downwardly extends. The hole 37 is provided at the different position from that of the hole 38 within the slider 26. Further, the longitudinal axis of the hole 38 extends in the perpendicular relation with the longitudinal axis of the hole 37. The bolt 39 is fitted into the hole 37.

The first arm 9 of the alternator 1 shown in FIG. 5 is located under the bracket 24. As shown in FIG. 7, the first arm 9 includes a hole 42 therein at the position corresponding to a hole 40 of the bracket 24. There is provided an internal thread on an inner periphery of the hole 42, with which the external thread of the bolt 39 engages. The bolt 39 downwardly extends through the hole 40 of the bracket 24, thereby engaging with the internal thread of the hole 42. The numeral 49 designates a spring washer. Further, as shown in FIG. 5, the alternator 1 is fixed through the bolt 39 to the bracket 24 at the first arm 9.

The operation for adjusting the V-belt 2 into the optimum tension force in a plant for manufacturing a vehicle, is made as the following procedures. The bolts 13 and 39 are loosened in FIG. 5 as a vehicle is on the way to be assembled. FIG. 6 illustrates such a condition as the V-belt 2 is loosened and the tension force applied onto the V-belt 2 is zero. When the adjust bolt 23 rotates in the direction C shown in FIG. 6, the slider 26 does not rotate because the slider 26 is connected by the bolt 39 with the first arm 9, and the adjust bolt 23 relatively rotates with regard to the slider 26. In this condition, while the V-belt 2 shown in FIG. 5 is not applied with a tension force, there is not generated a force for pulling the adjust bolt 23 in the direction as represented by the reference G shown in FIG. 6. Hence, the coil spring 25 is not compressed, and maintains the distance between the end 35 of the head portion 27 of the adjust bolt 23 and the end 34 of the bracket 24 to be equal to the natural length L. Hence, the position of the adjust bolt 23 is still maintained to be located at the same position with regard to the bracket 24. The slider 26 only slides in the direction B shown in FIG. 6. In this condition, the alternator 1 rotates around the bolt 13 in the clockwise direction (the direction A shown in FIG. 5). As a result, the slack of the V-belt 2 is removed, and the slider 26, which is located at the time when a tension force commences to apply onto the V-belt 2, illustrated in FIG. 8(a). In FIG. 8(a), the slider 26 or the first arm 9 of the alternator 1 moves in the direction represented by the reference B by the distance ($d_1-d_2$), compared with the position shown in FIG. 6. When the adjust bolt 23 further rotates in the direction represented by the reference C shown in FIG. 8 form the position shown in FIG. 8(a), the slider 26 slides in the direction B shown in FIG. 8(a). At the same time, the adjust bolt 23 is pulled in the direction G shown in FIG. 8(a) by the tension force of the V-belt 2. Hence, the coil spring 25 is gradually compressed, and there is generated a tension force on the V-belt 2, corresponding to the load of the compression coil spring 25. When the adjust bolt 23 further rotates, the adjust bolt 9 varies from the condition shown in FIG. 8(a) through the condition shown in FIG. 8(b) to the condition shown in FIG. 8(c). FIG. 8(c) illustrates such a condition as the end 36 of the first shaft portion 29 of the adjust bolt 23 contacts on the hole 33. In this condition, the slider 26 moves in the direction B shown in FIG. 8(a) by the distance ($d_2-d_4$) compared with the condition shown in FIG. 8(a). When the adjust bolt 23 further rotates in the direction C shown in FIG. 8, the first shaft portion 29 fits into the hole 33 while the first shaft portion 29 has a thread relation with the internal thread of the hole 33. Finally, the neck portion 28 of the adjust bolt 23 contacts on the end 34 of the bracket 24. The pitch of the external thread provided on the first shaft portion 29 is designed to be same as that on the second shaft portion 30. Hence, when the adjust bolt 23 rotates, the slider 26 moves in the direction B shown in FIG. 8 by the distance corresponding to the distance of the movement of the adjust bolt 23 which relatively moves to the bracket 24 in the direction G shown in FIG. 8. As a result, the position of the slider 26 relative to the bracket 24 does not change while the adjust bolt 23 rotates between the conditions shown in FIGS. 8(c) and (d). The tension force of the compression coil spring 25 in the condition shown in FIG. 8(c) becomes the final tension force applied onto the V-belt 2 shown in FIG. 5. According to the present embodiment, the spring constant of the compression coil spring 22 is determined to obtain the optimum tension force applied on the V-belt 2 when the coil spring 25 is compressed at the position shown in FIG. 8(c). In other words, the spring constant of the compression coil spring 22 is determined so that the optimum tension force of the V-belt 2 may become equal to the force of the coil spring 25 which is compressed by the distance ($L-l$) shown in FIG. 6.

Further, as the first shaft portion 29 of the adjust bolt 23 is connected through the inclined portion 50 with the second shaft portion 30, the first shaft portion 29 can smoothly fit into the hole 33. Hence, when a worker rotates the adjust bolt 23, the worker almost cannot recognize whether or not the adjust bolt 23 is positioned at the condition shown in FIG. 8(c). It is sufficient for the worker to rotate the adjust bolt 23 until the adjust bolt 23 cannot be rotated. In the case that the V-belt 2 is adjusted to have an optimum tension force in a plant for manufacturing vehicles, a worker rotates an adjust bolt 23 in the direction C shown in FIG. 6 and stops the rotation of the adjust bolt 23 when the adjust bolt 23 cannot be rotated. The condition shown in FIG. 8(d) corresponds to the condition when the adjust bolt 23 cannot be rotated. Thereafter, the worker fastens the bolts 13 and 39 shown in FIG. 5 and fixes the position of the alternator 1 to be mounted on the internal combustion engine. Thus, the operation for adjusting a tension force of the V-belt 2 is finished.

While the V-belt 2 is employed, the V-belt 2 happens to be loosened after vehicles are employed for a long time. This causes the adjustment of the V-belt 2 as to the tension force. Next, this adjustment of the V-belt is explained hereunder.

Figure 9A:
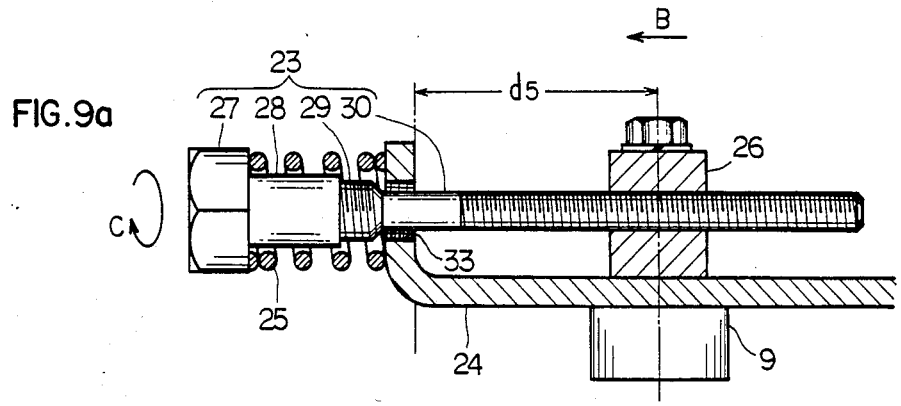
FIG. 9 is a view which illustrates the operated conditions of the belt tensioner in order to adjust the tension force after a force applied to a belt is reduced.

At first, worker loosens the bolts 13 and 39 shown in FIG. 5 and sets the alternator 1 in such a condition as the alternator 1 can be rotated. Next, the adjust bolt 23 is rotated in the opposite direction to that represented by the reference C shown in FIG. 8(d) and the first shaft portion 29 is discharged from the hole 33. This condition is shown in FIG. 9(a). In FIG. 9(a), the slider 26 further moves in the direction B shown in FIG. 9 compared with its position shown in FIG. 8(d). Hence, the distance $d_5$ between the slider 26 and the bracket 24 shown in FIG. 9(a) is less than the distance $d_4$ shown in FIG. 8(d).

Figure 9B:
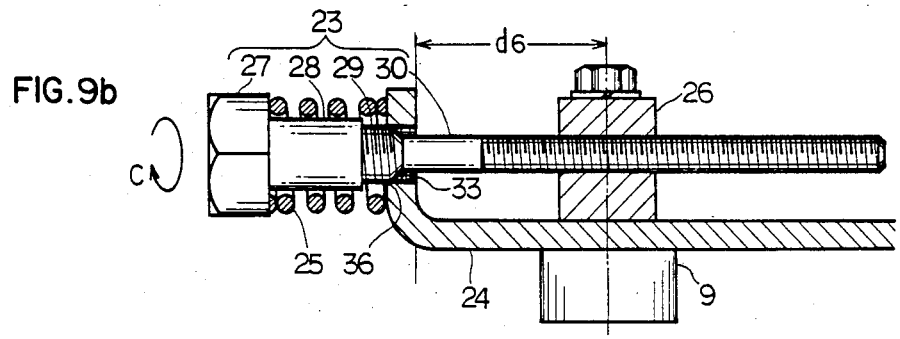
Figure 9C:
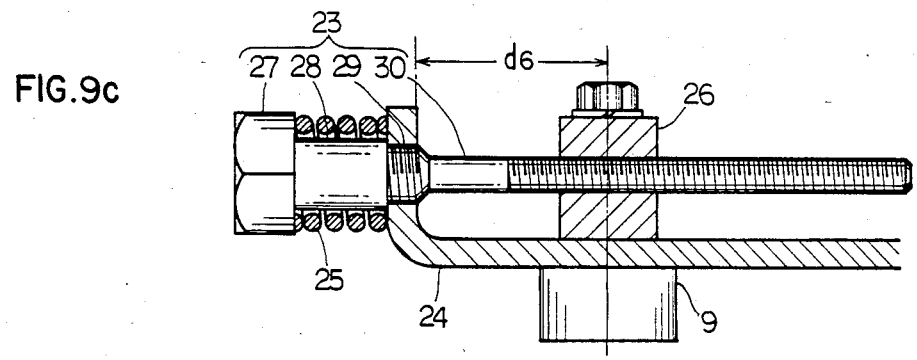

Next, when the adjust bolt 23 is rotated in the direction C shown in FIG. 9, the slider 26 moves in the direction B. At the same time, the coil spring 25 is compressed and the end 36 of the first shaft portion 29 comes into contact with the hole 33. In this condition, the slider 26 moves in the direction B by the distance ($d_5-d_6$) compared with the condition shown in FIG. 9(a). The force of the compression coil spring 25 in the condition shown in FIG. 9(c) applies on the V-belt 2 to obtain an optimum tension force. This tension force is equal to that in the condition shown in FIG. 8(c). When a worker adjusts a tension force applied on the V-belt 2, the worker cannot recognize whether or not it is in the condition shown in FIG. 9(b). Hence, the worker rotates the adjust bolt 23 until the belt tensioner is positioned in the condition shown in FIG. 9(c).

As apparent from the above description, a worker can adjust a belt tensioner by the following three procedure.

(1) At first, the bolts 13 and 39 shown in FIG. 5 are loosened in order that the alternator can be moved.

(2) Next, to apply an adequate amount of a tension force on the V-belt 2, the adjust bolt 2 is rotated, and the first shaft portion 29 is disengaged from the hole 33. Thereafter, the adjust bolt 23 is rotated in the direction C shown in FIGS. 8 and 9. When the adjust bolt 23 stops the rotation, the worker stops the rotation of the adjust bolt 23.

(3) Lastly, the bolts 13 and 39 are fastened to fix the alternator in the appropriate position.

According to the above embodiment, the neck portion 28 of the adjust bolt 23 is employed as a stopper. The compression coil spring 25 may be employed as a stopper instead of the neck portion 28 of the adjust bolt 23.

Figure 10:
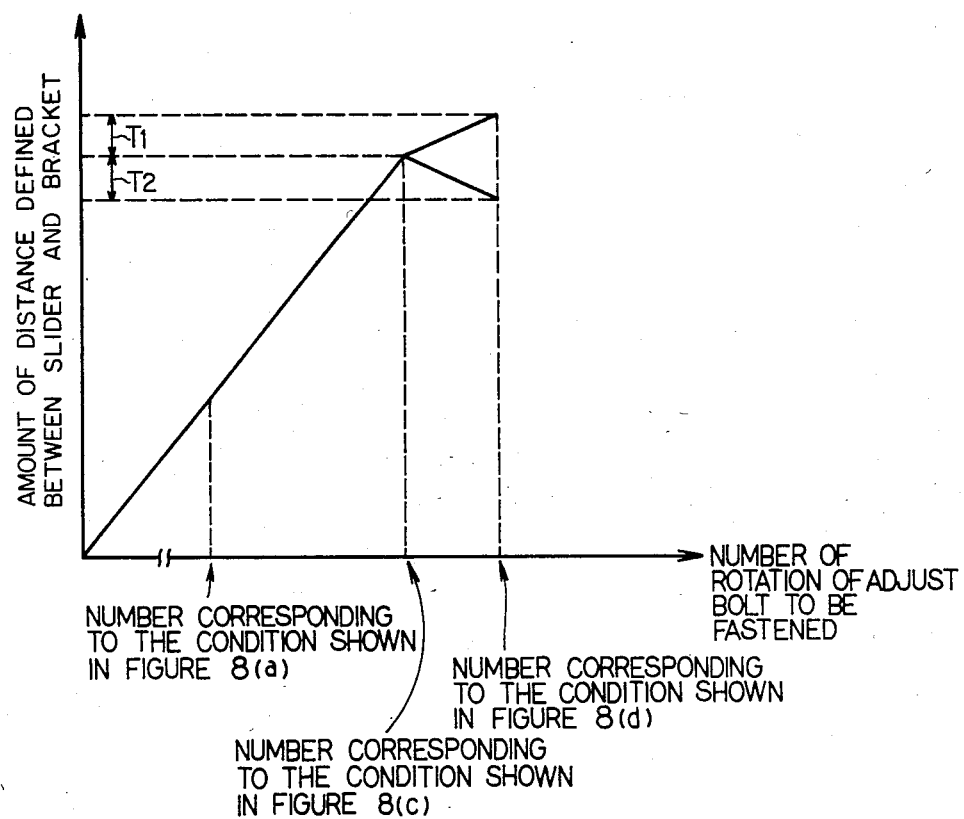
FIG. 10 is a graph which illustrates the relation between the number of rotation of an adjust bolt to be fastened and an amount of distance defined between a slider and a bracket.

Further, according to the above embodiment, the pitch of the thread provided on the first shaft portion 29 is designed to be equal to that on the second shaft portion 30. However, it is possible to set the different pitch on the first shaft portion 29 from that on the second shaft portion 30. For example, if the pitch of the thread provided on the first shaft portion 29 is set to be less that that on the second shaft portion 30, the slider 26 further moves in the direction B shown in FIG. 8 by the distance which is obtained by the equation (the pitch difference)×(the number of the threads of the shaft) when the adjust bolt 23 moves from the condition shown in FIG. 8(c) to the condition shown in FIG. 8(d). When the pitch of the thread provided on the first shaft portion 29 is set to be less than that on the second shaft portion 30, the distance of the movement of the slider 26 is shown in FIG. 10 by the reference $T_1$. Conversely, if the pitch of the thread provided on the first shaft portion 29 is set to be greater than that on the second shaft portion 30, the slider 26 moves in the opposite direction by the distance $T_2$ as shown in FIG. 10.

According to the present embodiment, the bracket 4 is a separate member from the internal combustion engine 3, but the belt tensioner is not limited thereto. The bracket may be intergral with the internal combustion engine 3.

Further, according to the present embodiment, the adjustment of the tension applied on the V-belt 2 is made by moving the alternator 1, but the adjustment may be made by a driven member except the alternator 1 (for example, an idle pulley).

While the present invention has been described in its preferred embodiments, it is to be understood the invention is not limited thereto, and may be otherwise embodied within the scope of the following claims.

What is claimed is:

1. A belt tensioner for adjusting a force of a belt tension of a belt for transmitting a torque of a driving member which is mounted on a main body to a driven member which is rotatably mounted on the main body, comprising:

an adjust means having a head portion, a first shaft portion connected to the head portion at one end thereof and including a thread thereon, and a second shaft portion connected the first shaft portion at one end thereof and including a thread thereon which is threaded in the same direction as that of the first shaft portion;

a bracket secured to said main body and having a hole with which said first shaft portion has a thread relation;

a slider means secured onto said driven member and having a hole with which said second shaft portion has a thread relation; and a biasing means provided between said head portion of said adjust means and said bracket and biasing said head portion of said adjust means in such a direction as said head portion of said adjust means is separate away from said bracket, whereby when said adjust means rotates in order to obtain an optimum belt tension on said belt, said slider moves in the direction to approach to said hole of said bracket and the optimum belt tension is obtained at the time when said head portion of said adjust means contacts on said bracket.

2. The belt tensioner of claim 1, wherein said head portion of said adjust means comprises an enlarged head and a neck portion which is secured to said enlarged head at one end thereof and secured to said first shaft portion at another end thereof, and said biasing means is provided between said enlarged head and said bracket.

3. The belt tensioner of claim 2, wherein said adjust means further comprises an inclined portion which is provided between said first shaft portion and said second shaft portion.

4. The belt tensioner of claim 1, wherein said bracket comprises a longitudinal portion which extends in an almost parallel relationship with said belt and which is fastened to said main body at one end thereof, and a radial portion which radially extends from another end of said longitudinal portion and in which said hole of said bracket is provided.

5. The belt tensioner of claim 1, wherein said driving member is a crank pulley and said driven member is an alternator.

6. The belt tensioner of claim 1, wherein said driven member is rotatably mounted by an arm which is mounted at said main body at one end thereof and which is fastened to said slider at another end thereof.

7. The belt tensioner of claim 1, wherein said biasing means is a compression coil spring.

* * * * *